April 6, 1948.   W. SCHAFROTH   2,439,189
STAPLE FEEDER
Filed Nov. 19, 1945   3 Sheets-Sheet 1
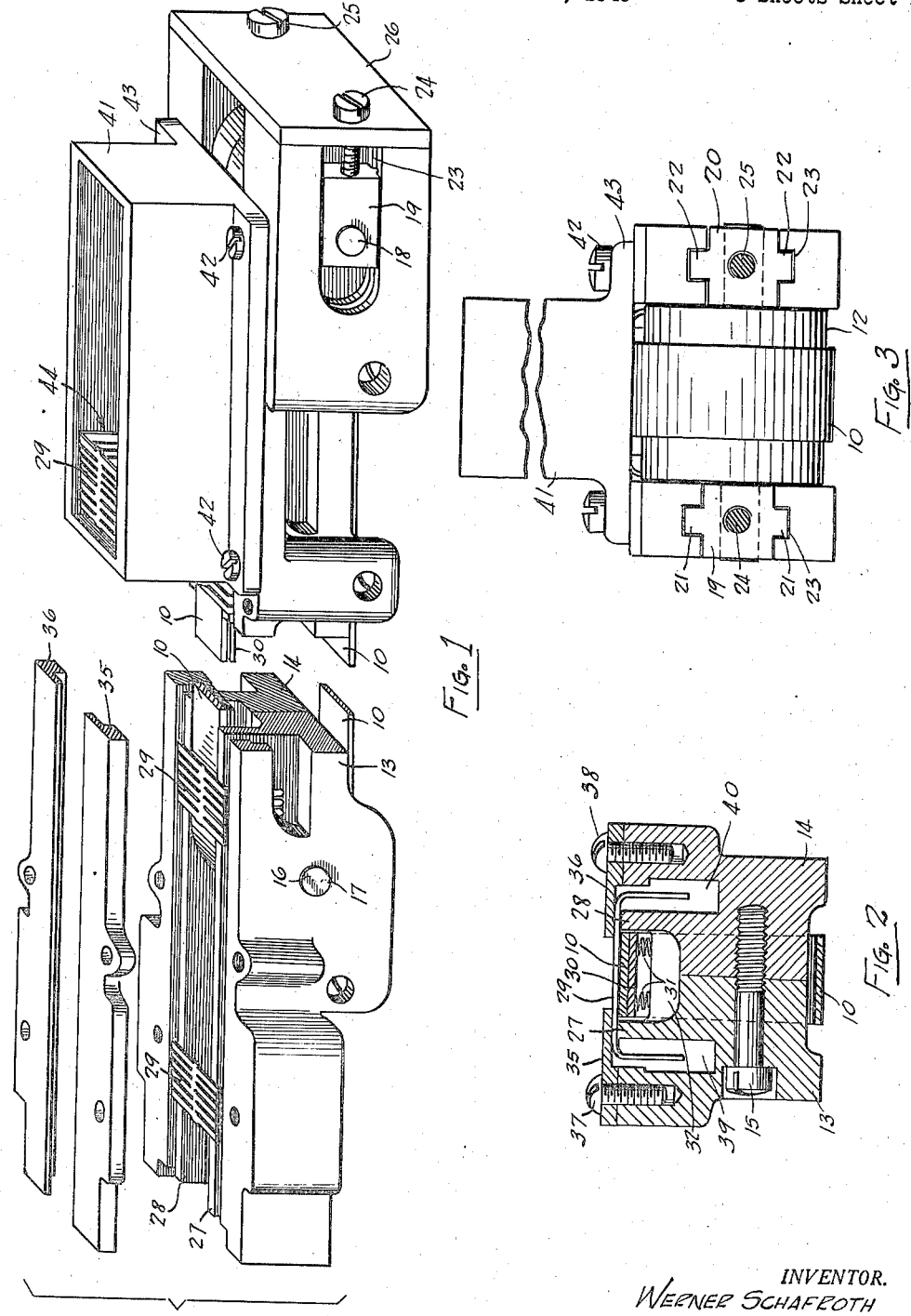
INVENTOR.
WERNER SCHAFROTH
BY Joshua R. H. Potts
HIS ATTORNEY.

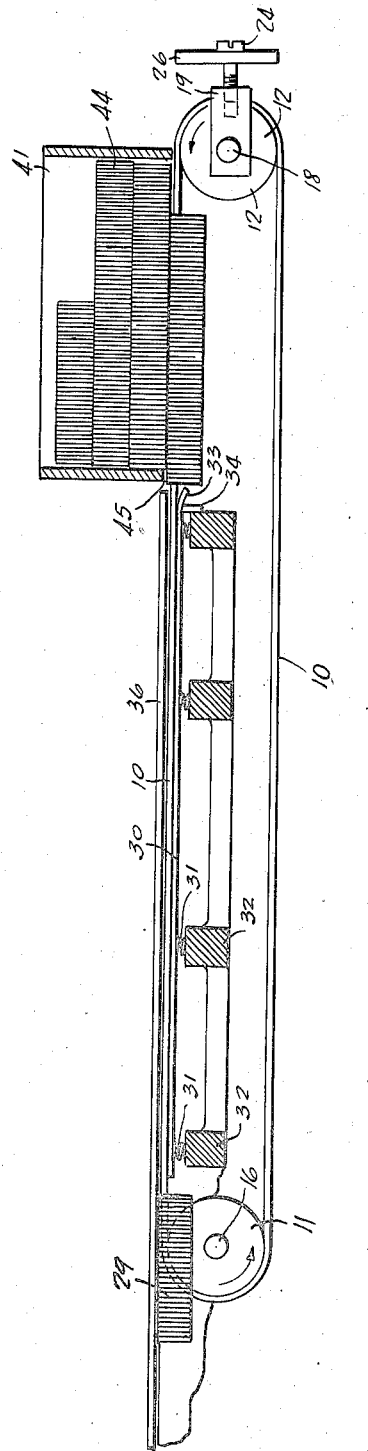

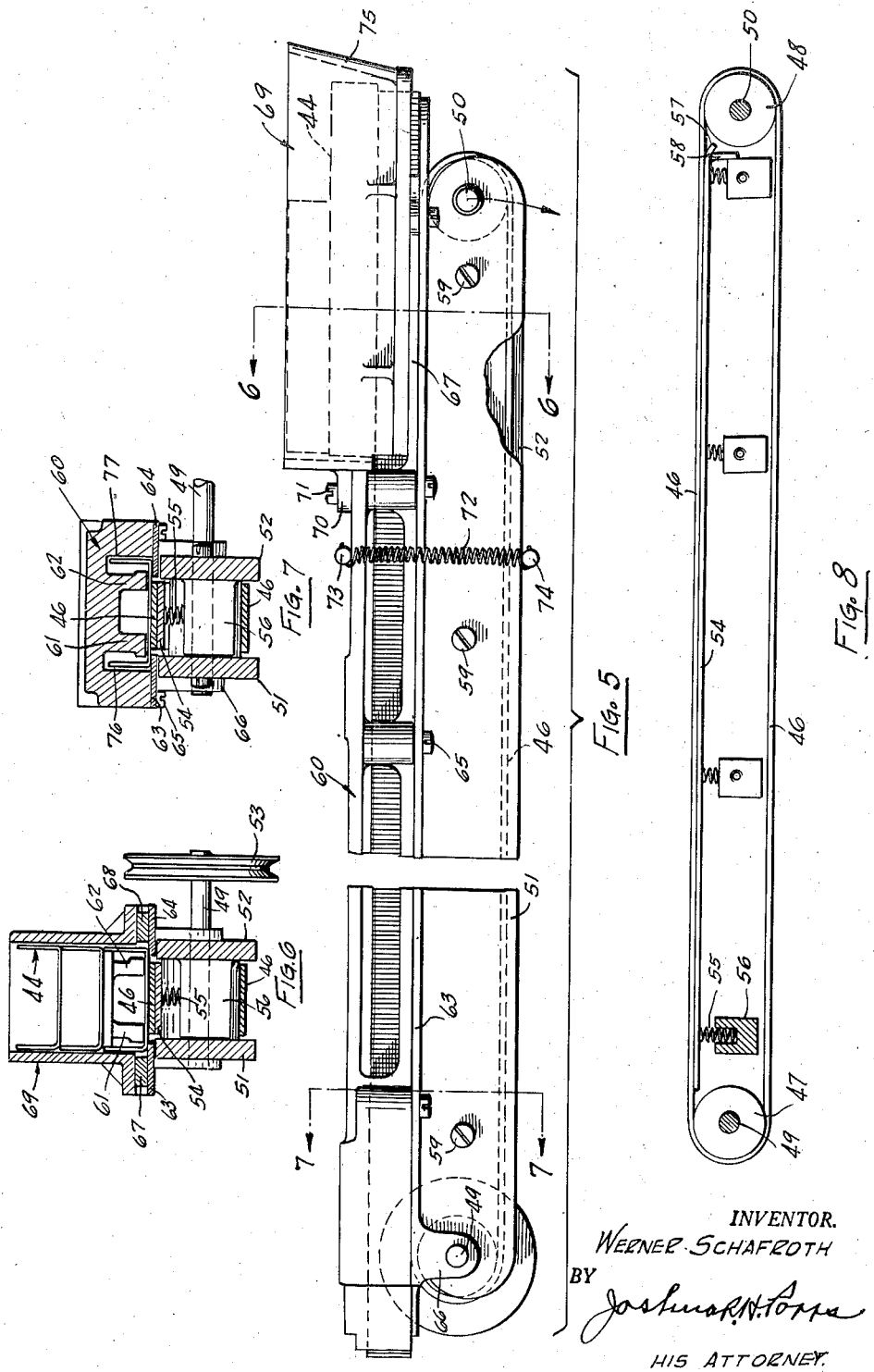

Patented Apr. 6, 1948

2,439,189

UNITED STATES PATENT OFFICE 2,439,189

STAPLE FEEDER

Werner Schafroth, Brookline, Pa., assignor to International Staple and Machine Company, Clifton Heights, Pa., a corporation of Pennsylvania Application November 19, 1945, Serial No. 629,355

9 Claims. (Cl. 1—3.1)

This invention relates to conveyors for feeding devices, such as staples, to stapling machines, where the stapling machines are used for continuous operation and the delay in stopping the machine for refilling the staple cartridge or strip would be objectionable.

More in particular the invention has to do with stapling machines for fastening edges of cardboard or corrugated paper containers traveling from an assembly or filling line where the containers are fed continuously and stoppage would hold up the entire line.

It also relates to containers that are fastened or closed at both the top and bottom or on two sides, so that it is necessary to feed the staples from the top or bottom or from either side.

Staples are normally fed in strips from storage hoppers, and those used on the upper sides of the containers are fed with their ends or legs extending downward, whereas those used on the underside are fed with their ends or legs extending upward.

The staples are supplied in strips in which they are held together at their edges only by an adhesive, and as they are readily broken, it is necessary that the feeder operate with a comparatively easy or smooth motion.

Another important condition in the successful operation of this feeding mechanism is that whereas continuous operation is essential in the feeder, the stapling machine being fed thereby must stop to move one carton therefrom and another in place thereon and, therefore, it is impossible to positively synchronize the operation of the two machines, so that the feeder must be constructed to provide slippage between the staples and feeding mechanism. With these features in mind, the object of this invention is to feed staples with the points or legs up or down, by frictional engagement, which permits slippage and at the same time keeps a yielding pressure against the staples at all times.

Another object is to provide means for maintaining tension through a belt upon objects traveling upon the belt, in which the belt is used as the feeding agent of said objects.

Another object of this invention is to provide means whereby objects may be freely fed to a feeding belt in which the objects are picked up and fed by the belt through frictional engagement therewith.

Another object is to provide a continuous feeding mechanism which at the same time provides no obstruction so that the feeding agent may pass by the objects thereon, being fed thereby, when the traveling action of the said objects is stopped.

Another object of this invention is to provide a continuous feeder having a central track with rails along which the objects travel, in which open areas are provided at the sides so that the said objects are only engaged at their intermediate portions.

Another object of the invention is to provide a continuous feeding mechanism in which endless belts are employed and means is provided for taking up the tension of the belt.

Another object is to provide support members for holding tension devices against the underside of the belt of a conveyor in which the support members are held from one side only to facilitate assembling the framework.

Another object is to provide overhead guard rails against which objects on a feeding belt conveyor may be resiliently held to expedite feeding.

Another object is to provide a floating friction rail on the underside of the belt of a feeding conveyor and means for holding said floating rail against endwise movement thereof.

Another object is to provide a feeding mechanism for staples and the like in which the staples are frictionally held by their upper and lower sides, and at the same time located laterally without engagement of the ends thereof.

A further object of this invention is to provide a friction staple feeder which may be used for staples of substantialy any type.

A still further object of the invention is to provide a combination staple feeding mechanism having units for feeding opposite strips of staples with legs or points of one strip extending upward and those of the other strip extending downward, in which either unit thereof may be used as a feeder independently.

And a still further object of this invention is to provide a staple feeding mechanism having conveyors with friction holding means in combination therewith, which are adapted to take strips of staples from hoppers and feed the said strips to stapling machines, which is of a comparatively simple and economical construction.

Various other more detailed objects and advantages such as arise in connection with the building, design and operation of a staple feeding machine in accordance with the above noted objectives will in part become apparent, and in part be hereinafter stated, as the description of the invention proceeds.

In order that these and other objects may be successfully accomplished, the feeder and feeding conveyors are mounted in suitable frames comprising center and side guide rails and guards, side plates and bearings in which pulleys of the conveyors are mounted, and suitable storage and feeding hoppers in which strips of staples may be stored, and from which they may be directly fed to the feeding conveyors.

More in detail the invention embodies endless belts mounted on pulleys with tension adjusting means at the ends, a floating plate forming a rail on one side of the belts, with springs urging the plates against the belt, rails at the sides or above the belts upon which staples may travel, with their points or legs extending in open areas at the sides of the rails, guard rails positioned in opposite relation to the said former rails, and against which the staples are frictionally held as they travel, and storage and feeding hoppers positioned at the ends and above the said belts.

For a full and more complete understanding reference may be had to the following description and accompanying drawings wherein Figure 1 is a perspective view showing the overhead feeder with the intermediate part broken away and with the guard rails removed and shown above.

Figure 2 is a typical cross section through the intermediate part of the feeder.

Figure 3 is a view showing an end elevation with an end plate removed.

Figure 4 is a typical cross section through the conveyor with parts omitted and with the belt and pulley thereof shown in elevation.

Figure 5 shows a side elevation of a modified feeder for the underside of a container, with part of the intermediate portion broken away.

Figure 6 is a cross section on line 6—6 of Figure 5.

Figure 7 is a cross section through the intermediate portion of the conveyor with the driving pulley omitted.

Figure 8 is a longitudinal section showing the belt, pulleys, frictional floating rail and support members, with one of the support members shown in section.

Because of the peculiar nature of the material being fed, the units of the conveying means cannot be reversed or inverted and, therefore, that portion of the feeder employed for feeding staples to the upper sides of containers is illustrated in Figures 1 to 4 inclusive, and that portion used for feeding staples to the underside of containers, in Figures 5 to 8 inclusive.

Referring now to the drawings wherein like reference characters denote corresponding parts, a staple feeding machine made in accordance with this invention, comprises an endless belt 10 mounted on pulleys 11 and 12 with the pulleys mounted in sides 13 and 14, which are held together by screws 15. The head pulley 11 is provided with a shaft 16 rotatably held in bearings 17 and the tail pulley 12 is provided with a shaft 18 rotatably mounted in sliding blocks 19 and 20, and the blocks are provided with tongues 21 and 22 that extend into slots 23 providing sliding movement to take up or adjust tension in the belt. The blocks 19 and 20 are adjustably held by screws 24 and 25 in an end plate 26.

At the sides of the belt 10 are rails 27 and 28 which are substantially on the same elevation as the upper surface of the belt so that they may engage the inner or under surfaces of the intermediate portions of the staples which are indicated by the numeral 29. The belt is resiliently held upward against the staples by floating plate 30 and this is held upward by springs 31 resting upon support members 32.

It will be understood that springs of any other type may be used or resilient members may be provided in any manner to urge the floating member 30 against the underside of the belt.

It will be noted that one end of the plate 30 is curved downward, as shown at the point 33 and a stop 34 is also provided to prevent the plate moving forward by frictional engagement with the traveling belt.

The feeder is also provided with guard rails 35 and 36 held to the side by screws 37 and 38 and these are positioned to engage the upper surfaces of the staples, as shown in Figure 2, so that the staples may be held between the upper surface of the belt and these rails and thereby frictionally held so that they will travel with the belt, but at the same time being free so that when the staples contact a stop, the movement thereof may cease while the belt continues to travel.

The sides of the conveyor are provided with open areas 39 and 40 in which the ends of the staples may be located so that they are free to travel without engagement with any form of obstruction. The staples may be fed from the rails 27 and 28 directly to a stapling machine with the staples passing upon a bar or part thereof.

At one end of the conveyor is a hopper 41 in which strips of staples may be stored and from which they may be fed to the conveyor belt. The hopper may be of any size or type and, whereas in the design shown it is attached to the upper edges of the sides of the conveyor by screws 42 through flanges 43, it will be understood that it may be mounted upon or attached to the conveyor in any suitable manner.

The underside of the hopper is open and the staples 29, being provided in strips as indicated by the numeral 44, may drop upon the upper surface of the belt, as shown in Figure 4, as one strip passes through an opening 45 at the forward end of the hopper.

In the design shown in Figures 5 to 8, an endless belt 46, corresponding to the belt 10, is mounted upon the pulleys 47 and 48 with shafts 49 and 50 rotatably mounted in side plates 51 and 52, and with the shaft 49 extending outward and provided with a pulley 53 by which the device may be operated.

In this design a floating plate 54, corresponding to the plate 30, is provided below the belt 46 and this is resiliently held upward by springs 55 and support members 56. One end 57 of this plate is also curved down, as shown in Figure 8, and this end is also provided with a stop 58 to prevent endwise movement thereof. The support members 56 are mounted on the inner surface of the side plate 52, as shown in Figures 6 and 7, and these extend over to substantially engage the inner surface of the side plate 51, where they are held to the plate 51 by screws 59.

The conveyor, in this design, is provided with an upper frame 60 having traveling rails 61 and 62 positioned to engage the inner surfaces of the staples and against which the staples are urged or resiliently held by the plate 54, and at the sides of the frame 60 are guard rails 63 and 64 which engage the under surfaces of the staples at the ends, providing sliding and traveling means therefor, as shown in Figure 7.

The rails 63 and 64 are held to the frame 60 by screws 65 and at one end of the feeder the rails are provided with bearings 66 in which the shaft 49 is rotatably mounted. The shaft 50 at the opposite end is rotatably mounted directly in the plates 51 and 52 and these are not connected to the rails 63 and 64.

At the opposite end of the feeder, the rails 63 and 64 are attached to spacing strips 67 and 68 and upon these a storage and feeding hopper 69 is mounted, as shown in Figure 5.

The forward end of the hopper is provided with a flange 70 by which it is held to the frame 60 by screws 71, and the frame and side plates 51 and 52 are resiliently held together by springs 72 at the sides, the springs being held in the ends of cross bars 73 and 74, the bar 73 extending across the upper side of the frame and the bar 74 extending across the lower side or edges of the plates 51 and 52.

The hopper 69 may also be of any size and adapted to hold as many strips of staples as may be desired, and it will be noted that one end 75 thereof is inclined, thereby providing means for feeding the strips of staples toward the opposite end where they may readily be picked up by the belt.

In this design, the strips of staples are placed in the hopper with their points or legs extending upward and the frame 60 is formed with openings 76 and 77 through which the upwardly extending ends of the staples may pass without obstruction.

While the mode of operation of each of the above described parts will be understood from the foregoing specification, a comprehensive description of the operation of the feeder is hereinafter set forth.

With the feeding conveyors arranged either separately or in combination, and with the hoppers filled or containing strips of staples, the endless belts may be operated with their upper portions traveling away from the hoppers, and as strips of staples drop upon the belt, the belt will carry them under or above the guard rails, as the case may be, where they will be frictionally gripped between the belt and rails. They will then travel with the belt until they are fed from the belt to the stapling machines and should they engage stops on the machines, the train of staples may stop, whereas the belt will continue to move.

Then as each staple is used, the staple will be continuously fed so that one is always in position for use by the stapling machines. Frictionally holding the staples in this manner makes it possible to insure the presence of a staple at the desired points in the stapling machines continuously and without interruption, and as the supply of staples in the hoppers may be replenished while the feeders are operating, the stapling machines are not required to stop when the supply of staples in the feeders is being replenished.

While preferred specific embodiments of the invention are hereinbefore set forth, it is to be clearly understood that the invention is not to be limited to the exact constructions illustrated and described, because various modifications of these details may be provided in putting the invention into practice within the purview of the appended claims.

What is claimed is:

1. A staple feeding device comprising rails positioned to contact the intermediate portions of the staples, with open passages at the sides of the rails for free passage of the ends of the staples, a moving belt positioned between the rails adapted to contact the intermediate portions of the staples, means resiliently holding the belt against the staples, guard rails positioned above the belt and staples against which the said resilient means holds the staples, and means feeding said staples to the said belt.

2. A staple feeder comprising an endless belt, means feeding staples to the belt with the ends of the staples extending downwardly, guide rails at the sides of the belt providing sliding contact with the intermediate portions of the staples, guard rails above the belt also providing sliding contact with the staples, and means resiliently urging the belt and staples thereon toward the guard rails above the belt.

3. A staple feeder comprising an endless belt, means feeding staples to the belt with the ends of the staples extending upwardly, rails at the sides of the belt providing sliding contact with the intermediate portions of the staples, other rails above the belt also providing sliding contact with the staples, means resiliently urging the belt and staples thereon toward the said other rails above the belt, and means adjusting the tension of the belt.

4. A staple feeder comprising an endless belt, means feeding staples to the belt with the ends of the staples extending downwardly, guide rails at the sides of the belt providing sliding contact with the intermediate portions of the staples, guard rails above the belt also providing sliding contact with the staples, and means resiliently urging the belt and staples thereon toward the guard rails above the belt, said feeder providing slippage between the belt and staples so that certain staples may continue to travel when other staples stop.

5. A staple feeding device comprising a traveling belt, means at the sides of the belt providing sliding contact thereover with the under surface of the staples frictionally engaged with the belt, superimposed means positioned to provide sliding contact with the upper surfaces of the staples, said superimposed and said first mentioned means defining a passageway therebetween, said passageway providing free and unobstructed passage for the ends of staples, a floating plate contacting the said belt, and other means resiliently urging said floating plate toward the belt.

6. A staple feeding device comprising a traveling belt, rails at the sides of the belt providing sliding contact thereover with the under surface of staples frictionally engaged with the belt, superimposed rails positioned to provide sliding contact with the upper surfaces of the staples, said superimposed and said first mentioned rails defining a passageway therebetween, said passageway providing free and unobstructed passage for the ends of staples, a floating plate contacting the said belt, means to vary the tension of the belt, and means to permit the removal of the superimposed rails, when desired.

7. A staple feeding device comprising a traveling belt, rails at the sides of the belt providing sliding contact thereover with the under surface of staples frictionally engaged with the belt, superimposed rails positioned to provide sliding contact with the upper surfaces of the staples, said superimposed and said first mentioned rails defining a passageway therebetween, said passageway providing free and unobstructed passage for the ends of staples, a floating plate contacting the said belt, means yieldingly supporting the floating plate in contact with the belt, and other means for feeding staples to said belt.

8. A staple feeder comprising an endless belt, means feeding staples to the belt with the intermediate portion of the staples in contact with the belt and the legs of said staples extending downwardly, guide means at either side of the belt and arranged between the adjacent edge of said belt and an adjacent leg of each staple, said guide means providing sliding contact with the staples, and other means resiliently urging the belt and staples thereon toward the said guard rails.

9. A staple feeder comprising an endless belt, means feeding staples to the belt with the intermediate portion of the staples in contact with the belt and the legs of said staples extending upwardly, guide means at either side of the belt and in slidable contact with the said intermediate portion, other means accommodating the legs of the staples, and providing sliding contact with the said intermediate portion, and additional means resiliently urging the belt and staples thereon toward said other means.

WERNER SCHAFROTH.

REFERENCES CITED

The following references are of record in the file of this patent:

UNITED STATES PATENTS

| Number | Name | Date |
|---|---|---|
| 326,153 | Richards | Sept. 15, 1885 |
| 326,246 | Richards | Sept. 15, 1885 |
| 509,732 | Hahn | Nov. 28, 1893 |
| 773,184 | Bashore | Oct. 25, 1904 |
| 987,024 | Startevant | Mar. 14, 1911 |
| 1,536,252 | Walstrom | May 5, 1925 |
| 1,586,064 | Briggs | May 25, 1926 |
| 2,221,236 | Gay | Nov. 12, 1940 |
| 2,268,102 | Attula | Dec. 30, 1941 |
| 2,286,250 | Albertoli | June 16, 1942 |